Patented Dec. 3, 1940

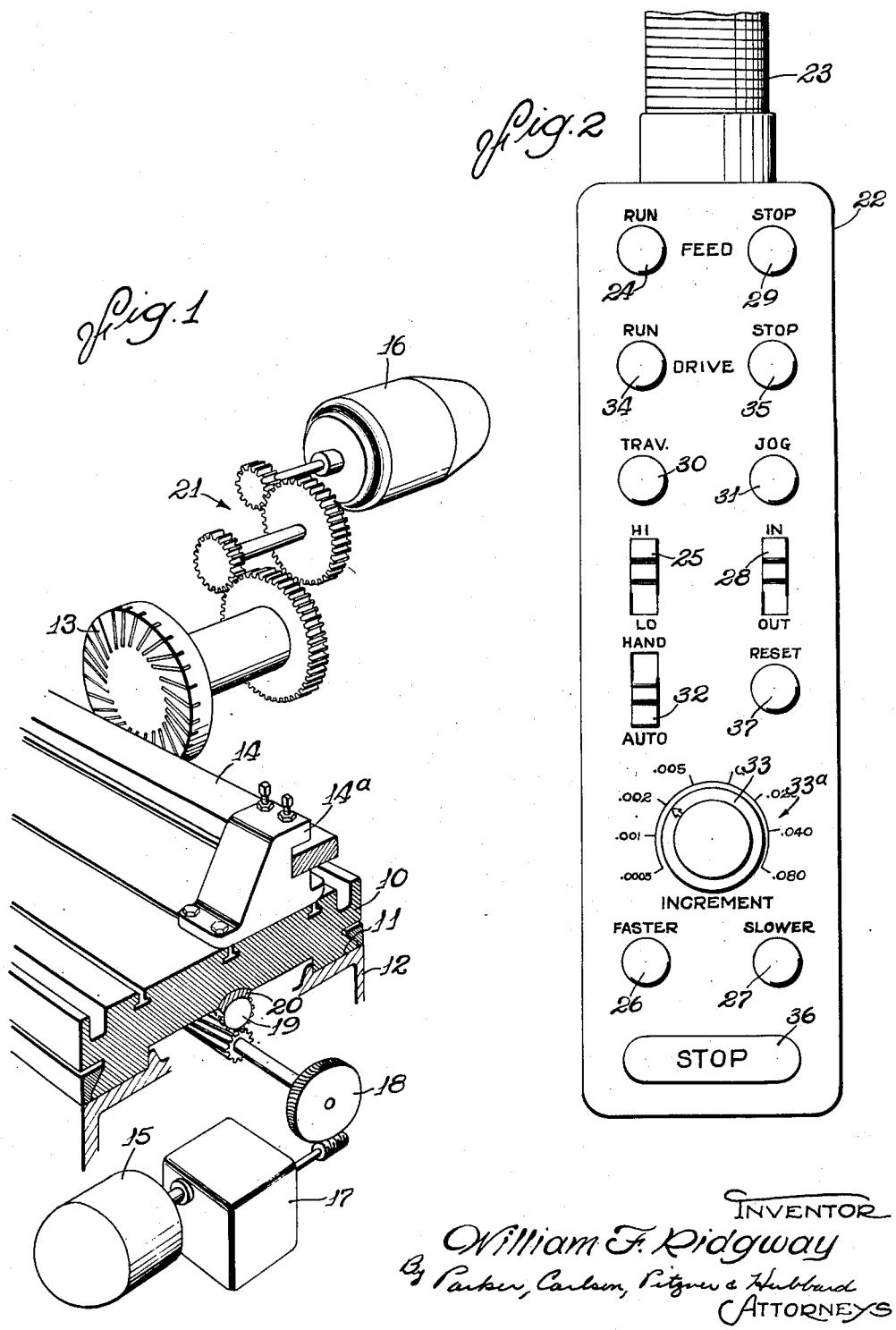

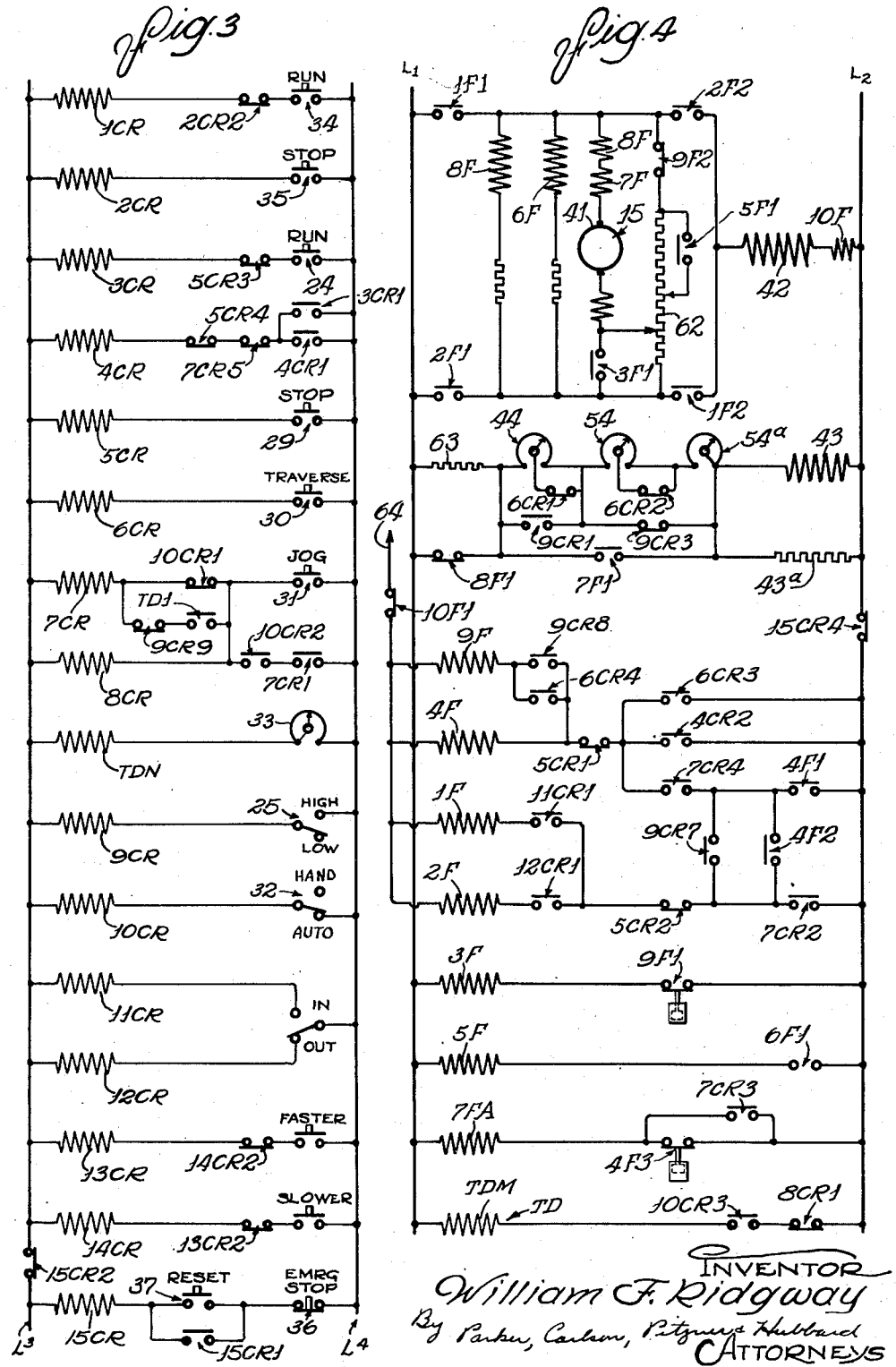

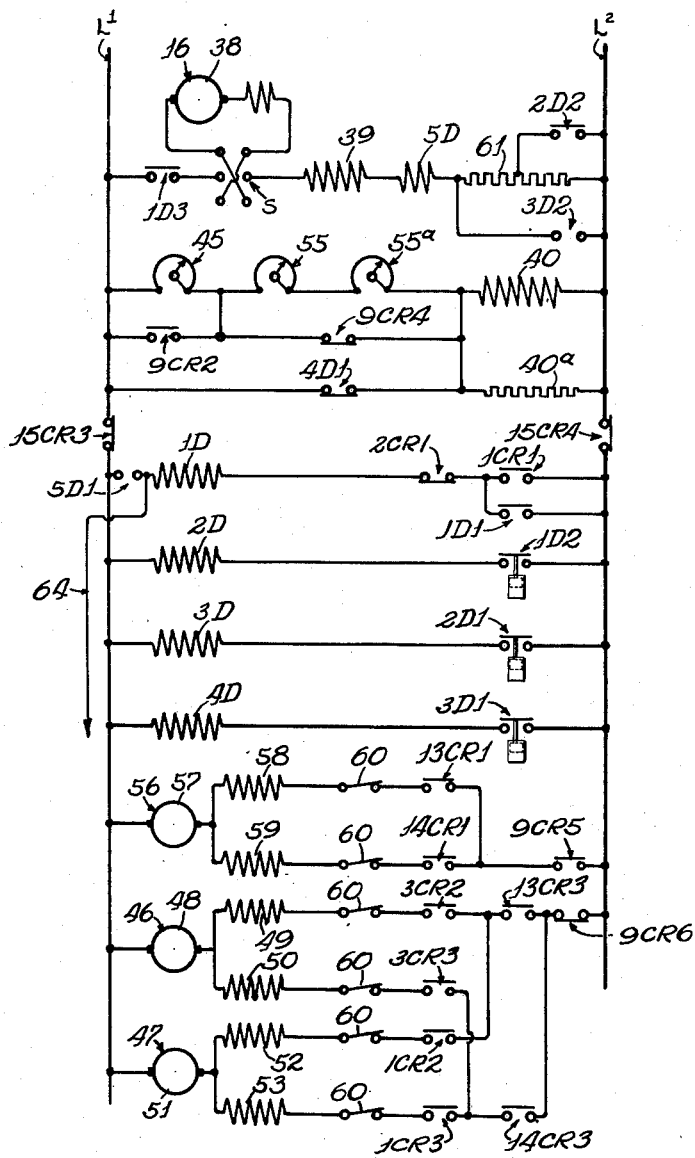

2,224,107

UNITED STATES PATENT OFFICE 2,224,107

MACHINE TOOL

William F. Ridgway, Rockford, Ill., assignor to The Ingersoll Milling Machine Company, Rockford, Ill., a corporation of Illinois Application August 6, 1938, Serial No. 223,423

23 Claims. (Cl. 90—21)

The present invention relates to machine tools and more particularly to improvements in the power drives thereof, as well as the associated control devices, to the end that a highly flexible operation of the machine tool may be attained with consequent increase in the operating precision and adaptability of the machine tool.

One object of the present invention is to provide a machine tool embodying a movable element such as a work supporting carriage or cutting tool driven by a single electric motor so controlled that the machine tool element may be driven at either fast or slow feed rates without the interposition of speed change gearing or like complications.

A further object of the invention is to provide in a machine tool including a movable element, such as a work supporting carriage or cutting tool, a power drive therefor embodying only a single electric motor and yet capable of driving the element at widely divergent selected speeds but with good speed regulation even upon abrupt changes in load as the machining operations progress through various stages. This type of operation is to be contrasted with that heretofore obtained when using a single variable speed electric motor equipped with the usual control circuits in which the speed regulation is sufficiently close for precise machining operations only throughout a comparatively limited "basic speed range" in which the ratio of the upper and lower limits of the speed range is only about 4 to 1 and even with very expensive motors does not exceed 8 to 1. The improved control arrangement herein disclosed makes possible variations in motor driving speeds throughout not only the basic range but also a lower range of speeds in which the ratio of the upper limit of the basic range to the lower limit of the lower range may be as much as 100 to 1 or even more.

A further object of the invention is to provide, in a plural element machine tool having individual drive mechanisms for each element, a simplified switch control panel which can be readily carried about the machine by the operator thus enabling him to follow closely the progress of the work while at the same time retaining the controls constantly within reach and thereby in general increasing not only the speed with which the machine tool may be operated but also the precision of the machine operations performed. The use of such a small compact portable control panel with only a few switches on it to control a complicated machine is accomplished, as herein disclosed, by the use of a simplified control for the drive mechanisms in which, for example, a single switch is used sequentially for varying the speed or other operating characteristics for selected ones of the drive mechanisms as contrasted with an arrangement in which separate control switches are provided for each one.

Another object of the invention is to provide a new and improved form of machine tool drive by means of which a desired relation between cutter and feed speeds may be conveniently and automatically obtained.

Still another object of the invention is to provide a machine tool embodying an improved drive control effective to jog the driven machine elements automatically through selected increments of distance as, for example, in the initial positioning of the work piece with respect to the cutting tool prior to the machining operation.

More specifically, it is an object of the invention to provide in a machine tool drive an adjustable control provided with an indicator graduated in, say, thousandths of an inch, together with an associated drive for automatically jogging the driven machine tool element through the incremental distance selected on the indicator so that the operator can quickly aline the machine elements in a desired relation and with a high degree of precision.

Further objects and advantages of the invention will become apparent as the following description proceeds taken in connection with the accompanying drawings, in which Figure 1 is a schematic representation of a machine tool embodying the present invention.

Fig. 2 is a front elevation of the portable switch panel or control station for the machine tool of Fig. 1.

Fig. 3 is a wiring diagram of the low voltage control circuits of the control panel of Fig. 2.

Figs. 4 and 5 are wiring diagrams of, respectively, the feed and drive motors of the machine tool.

For purposes of illustration of its various novel features, the invention has been shown herein as embodied in a horizontal table milling machine, but it will be understood that the invention is applicable to a wide variety of other types of machine tools. Accordingly, there is no intention to limit the invention to the particular embodiment disclosed, but on the other hand, the appended claims are intended to cover all modifications and alternative constructions falling within the spirit and scope of the invention.

The milling machine illustrated (Fig. 1) comprises an elongated horizontal table or work supporting carriage 10 slidable endwise along longitudinal ways 11 fashioned on the top of a fixed bed 12. A cooperating rotatable milling cutter or metal removing tool 13 is journaled for rotation at the side of the carriage, being disposed for operative engagement with a work piece 14 secured to the carriage by the usual clamping mechanisms 14ᵃ. Feeding movement of the carriage 10 and rotation of the milling cutter 13 are effected by means of their individual power actuated mechanisms shown herein as an electric feed motor 15 and a drive motor 16 respectively. Speed change gearing has been dispensed with in both instances, the feed motor 15 being connected to the horizontally slidable table 10 through a speed reduction gearing in a gear case 17, a worm and worm wheel 18 and a screw 19 meshing with a rack 20 fast on the underside of the table. Similarly, the drive motor 16 is connected directly to the cutter 13 through a gear train designated generally by the numeral 21. All variations in speed of the machine tool elements, and wide variations are herein contemplated, are achieved by corresponding changes in motor speeds.

The motors 15 and 16 are governed by the operator through the manipulation of a set of switches mounted on a portable control panel or station 22 (Fig. 2). Because of the small number of manual switches involved in the improved arrangement herein contemplated, these switches may, if desired, be mounted on the compact little portable control station 22 attached to a flexible cable 23. This control station or box is small and light enough in weight that it need not be fixed to the machine in the usual manner, or hung from a crane arm but may, in fact, be carried about in the operator's hand. His inspection of the progress of the machining operations is, therefore, not hampered by the necessity of standing by some fixed and comparatively remote control station. This portability of the controls is not, however, accomplished by any commensurate diminution in the controlling operations which may be performed. On the other hand, manipulation of the various switches on the portable station 22 serve to:

(a) Start the feed motor 15—by momentarily depressing a feed motor "run" push button 24;

(b) Condition the feed motor drive for either fast-feed or slow-feed—by operating a two-position tumbler switch 25 to the corresponding "Hi and Lo" positions;

(c) Vary the speed of the feed motor 15 within its slow-feed range—by depressing the corresponding "faster" push button switch 26 or "slower" push button switch 27 together with the feed "run" button 24;

(d) Simultaneously vary the speeds of both the feed and drive motors throughout their high speed ranges by depressing the corresponding "faster" or "slower" push buttons 26—27;

(e) Change the direction of table feed—by shifting an "in" and "out" two-position tumbler switch 28;

(f) Stop the feed motor 15—by momentarily depressing a feed motor "stop" push button switch 29;

(g) Traverse the table 10 in either direction at a rapid traverse rate—by holding down a "traverse" push button 30;

(h) Jog the table under manual control at either a fast-feed or slow-feed speed—by holding down a "jog" push button 31 after having moved the speed range selector 25 to the corresponding "Hi" or "Lo" position;

(i) Jog the table 10 through a selected increment of distance with an automatic stop at the end of the jog movement—by shifting a tumbler switch 32 from the "hand" position to the "auto" position and depressing the "jog" button 31, the increment of distance to be moved being selected by turning an increment selector knob 33;

(j) Start the drive motor 16—by momentarily depressing the drive motor "run" push button 34;

(k) Vary the drive motor speed individually throughout its normal speed range—by pushing the drive "run" button 34 and simultaneously depressing either the "faster" or "slower" push button 26—27;

(l) Stop the drive motor 16—by momentarily depressing the drive motor "stop" push button 35;

(m) Instantaneously stop all of the motors in the machine tool—by momentarily depressing the emergency stop bar 36;

(n) Recondition the control circuits for subsequent operation after an emergency stop—by depressing the "reset" push button 37.

All of the push button switches on the panel 22 are of the hold-down type. In other words, they are spring biased to their projected or outer positions and return to such positions as soon as the pressure of the operator's finger on them is released.

Minimization of the number of control devices required is attained in general first, by the use of a single power actuating mechanism for driving each movable machine tool element through a wide variety of speeds, and second, by the use of the same switch or set of switches to perform a number of different functions. For example, it will be seen from the foregoing tabulation that the speeds of both the feed motor 15 or the drive motor 16 can be varied simultaneously throughout their high or normal speed ranges by the single set of "faster" and "slower" push buttons 26—27 and furthermore, these same speed change buttons can be used to vary the speed of the feed motor 15 throughout its slow-feed range as well as to vary individually the speed of the drive motor throughout its normal speed range. All speed variations are thus accomplished by this single speed change control mechanism. Similarly, the "Hi—Lo" switch 25 conditions the feed motor 15 for operation in its fast-speed or slow-speed ranges under the control of either the "jog" button 31 or the continuous-operation "run" button 24.

Both of the motors 15 and 16 have been illustrated (Figs. 4 and 5 respectively) as being of the compound type, that is, having both series and shunt fields and variations in speed throughout the various speed ranges are, in general, obtained by changing the shunt field excitation. The drive motor 16 is provided with an armature 38, a series field 39 and a shunt field 40 (Fig. 5) while the feed motor 15 is provided with an armature 41, a series field 42 and a shunt field 43 (Fig. 4). Discharge resistors 40ᵃ and 43ᵃ are connected in parallel with the respective shunt fields. Current is supplied to the motors and to a portion of the control apparatus from high potential supply lines $L_1$ and $L_2$, while current is supplied to the low voltage control circuits in the portable control station 22 from low potential supply lines $L_3$—$L_4$ (Fig. 3).

The operating circuits for the feed motor 15 and drive motor 16 have been shown respectively in Figs. 4 and 5. These wiring diagrams are of the so-called line-to-line type and in each case the connections are shown between two high voltage supply lines $L_1$ and $L_2$. In addition to being interconnected by the supply lines $L_1$—$L_2$, the circuits of Figs. 4 and 5 are also interconnected by a conductor 64 for a purpose hereinafter described. The low voltage circuits shown in Fig. 3 have also been illustrated with a line-to-line type of wiring diagram with the various devices connected between low voltage supply lines $L_3$ and $L_4$. The high voltage supply lines may, for example, be 230 volts direct current and the low voltage supply 24 volts direct current. Various low voltage operated relays or electromagnetic switches included in the apparatus of Fig. 3 are provided with contacts which control the high voltage circuits of Figs. 4 and 5. The low voltage control relays are designated by the letters "CR" with a preceding number to indicate the particular relay in question such as 1CR, 2CR, and the like. The designations for the contactors or relays controlling the drive motor 16 in each case include the letter "D" and comprise an electromagnetic circuit maintaining switch 1D, sequentially operable time delay relays of the dash-pot type 2D and 3D, a field control contactor 4D, and an overload relay 5D. Reversal of the drive motor 16 is accomplished by a manually operated double throw switch S. Similarly, the contactors and relays for governing the feed motor 15 are indicated by reference letters in each case including the letter "F." These latter contactors or relays include main reversing contactors 1F and 2F, a dash-pot type time delay relay 3F, an intermediate control relay 4F, a dynamic braking resistance control relay 6F, accelerating and decelerating control relays 7F and 8F, a fast-feed contactor 9F, and a time delay relay TD provided with a main winding TDM (Fig. 4) and a neutralizing winding TDN (Fig. 3) associated with the automatic jog control mechanism as will hereinafter appear. The contacts for the various relays and electromagnetic switches or contactors are designated by the same letters and numerals used for the device as a whole with a separate contact-set number added. For example, control relay 1CR has contacts 1CR1 and 1CR2, etc.

Individual variations in the speed of the feed and drive motors are attained by rheostats 44 and 45 (Figs. 4 and 5) inserted in the respective shunt field circuits of these motors. These rheostats are operated respectively by reversible rheostat motors designated generally as 46 and 47 (Fig. 5). The rheostat motor 46 is provided with an armature 48 and alternatively energizable fields 49—50 for causing the motor to rotate in opposite directions to increase and decrease respectively the speed of the associated feed motor 15. Similarly, the rheostat motor 47 is provided with an armature 51 and alternatively energizable field windings 52—53 which also cause this rheostat motor to rotate in opposite directions so as to increase or decrease the speed of the associated drive motor 16.

In certain high speed metal removing operations, it is desirable that a predetermined speed relation be maintained at all times between the feed and drive motors. For this purpose, two mechanically interconnected rheostats 54 and 55 (Figs. 4 and 5) may be inserted in the respective shunt field circuits of the drive and feed motors in lieu of the individually operable rheostats 44 and 45. These rheostats 54 and 55 are mechanically interconnected so that a change in the setting of one is always accompanied by a corresponding change in the setting of the other. By such an arrangement, the rheostats may be connected in tandem to increase or decrease simultaneously the speeds of the two motors; alternatively they may be connected in such a manner as to accomplish an increase in the speed of one motor with a proportionate decrease in the speed of the other and vice versa, so that a predetermined constant tool speed across the work piece surface is maintained. A reversible rheostat motor 56 (Fig. 5) serves to drive the two mechanically interconnected or synchronized rheostats 54—55. Like the other rheostat motors, this motor includes an armature 57 and two alternatively available fields 58 and 59 for energizing the rheostat motor 55 to rotate in opposite directions. The particular controls illustrated are those for simultaneously increasing and decreasing the speeds of the feed and drive motors, the rheostat motor field 58 being arranged to cause the rheostat motor 56 to rotate in a direction to increase the motor speeds simultaneously, and the field 59 to decrease them. Manually adjustable calibrating resistors 54$^a$ and 55$^a$ connected in series with the rheostats 54 and 55 respectively are used to adjust the overall resistance of these two rheostats so that a selected speed ratio can be obtained between the motors 15 and 16. In order to prevent damage to the rheostats 44, 45, 54, and 55, a series of limit switches 60 (Fig. 5) are positioned on the respective rheostats, and connected with the rheostat adjusting motor field windings as shown, in such manner as to open-circuit the respective rheostat driving motor whenever the rheostats reach their respective limits of adjustment. In general, it will be seen that alternatively available variable-setting speed-change devices, in the form of rheostats 44—45 and 54—55, have been provided for varying the speeds of the motors 15 and 16 either individually or proportionately as conditions may require.

To condition the machine tool for operation, voltage is applied to the main supply lines $L_1$—$L_2$ by momentarily depressing the "reset" push button 37 (Fig. 3). This energizes the relay 15CR (by connecting it across the low voltage supply lines $L_3$—$L_4$) and it is maintained energized by the circuit established through its sealing contacts 15CR1. The second set of contacts 15CR2 completes the supply circuits to the remaining low voltage control devices while the contacts 15CR3 and 15CR4 (Fig. 5) connect the feed and drive motor magnetic control switches to the high voltage supply lines $L_1$ and $L_2$. This arrangement affords certain protective features for the machine. First, if there is a failure of the low voltage supply on the lines $L_3$—$L_4$, the control relay 15CR will either fail to operate in the first instance, or drop out later if the failure occurs subsequently so that no current will be supplied through the high voltage lines $L_1$—$L_2$ to the feed and drive motor electromagnetic control switches. Second, if the control line cable 23 (Fig. 2) should be caught in the machine and broken off or otherwise accidentally ruptured, the current supply to the relay 15CR (which passes through the "stop" switch 36 and thence through the cable) is cut off, thereby stopping the machine or, in other words, causing it to "fail safe."

Immediate stoppage of the entire machine in any emergency can be made by opening the "stop" switch 36 which is provided with a prominent bar-shaped head easily located by the operator at any time. Opening of the switch 36 (Fig. 3) deenergizes the relay 15CR so that it opens its contacts noted above and cuts off the supply of current to all of the motor control switches. Thereafter, it is necessary to close the "reset" switch 37 again in order to restart the machine.

*Drive motor operation*

In the event that it is desired to operate the drive motor 16 with a preselected speed ratio with respect to the feed motor 15, the tumbler switch 25 is first shifted to its "Hi" position. This conditions the motor 16 for operation under the control of the synchronizing rheostat 55. As will hereinafter appear, the feed motor 15 is also conditioned by this same preliminary selector switch setting for operation under the control of its rheostat 54 which is connected in tandem with the rheostat 55 as was previously explained. As to the drive motor circuits, however, the closure of the speed range selection switch 25 in its "Hi" position (Fig. 3) energizes the control relay 9CR (by connecting it across supply lines L3—L4) which shunts out the rheostats 44 and 45 by closure of the contacts 9CR1 and 9CR2 (Figs. 4 and 5 respectively) and simultaneously cuts the rheostats 54 and 55 into circuit by opening its contacts 9CR3 and 9CR4. At the same time, contacts 9CR5 (Fig. 5) are closed in the circuit of the rheostat motor 56 and the other rheostat motors 46 and 47 are open-circuited by contacts 9CR6.

The operator may start the cutting tool drive motor 16 by momentarily depressing the "run" push button 34. Such a momentary closure of this push button switch 34 (Fig. 3) momentarily energizes the control relay 1CR which in turn completes a circuit for the sealing contactor 1D (Fig. 5) through its momentarily closed contacts 1CR1, whereupon the contactor sealing contacts 1D1 are closed to establish a maintaining circuit for the contactor 1D in shunt with the momentarily closed contacts 1CR1. The sequential energization of the relays 2D, 3D, and 4D is initiated by such energization of the switch or relay 1D. In detail, the contacts 1D2, controlled by an attached dash-pot device of conventional construction in such relays, close after a predetermined time interval to energize the relay 2D. Similarly, the dash-pot controlled contacts 2D1 of the relay 2D close after a predetermined time interval to energize the relay 3D, and after a third predetermined time interval, the contacts 3D1 of the relay 3D close to energize the relay 4D.

The sequential closure of these relay contacts in the order noted above is utilized to effect successive switching operations in the starting of the drive motor 16. Thus, when the switch 1D is first energized, its contacts 1D3 close to complete an energizing circuit for the drive motor armature 38 and series field 39 through an associated starting resistor 61 (Fig. 5). Upon the subsequent energization of the switch or relay 2D, its contacts 2D2 shunt out a portion of this starting resistance and the still later closure of the contacts 3D2 shunts out the remainder of the starting resistance. Also, during the starting operation, the motor shunt field 40 is connected directly across the supply lines L1—L2 through the normally closed contacts 4D1 of the relay 4D. The energization of this last relay opens these contacts and thereby removes the shunt from about the rheostat 55 so that the latter becomes operative to control the drive motor. In other words, the drive motor is started with full shunt field and reduced armature current and after it comes up to speed the field rheostat 55 is cut into circuit to control the motor speed. Thereafter, the motor 16 operates at a speed determined by the setting of the rheostat 55.

In the event of an overload on the drive motor 16, it will be automatically stopped by the operation of the associated overload relay 5D. This latter relay (Fig. 5) is a current relay connected in series with the motor armature 38 and series field 39. When an excessive current is drawn by the drive motor due to overload, the relay 5D opens its contacts 5D1, thereby breaking the energizing circuit of the circuit maintaining contactor 1D. When the contactor 1D is thus opened, it in turn causes the relays 2D, 3D, and 4D to be deenergized serially, thereby open-circuiting the drive motor 16 and stopping the same. Similarly, the drive motor may be stopped at will by the operator's momentary depression of the push button "stop" switch 35. Such a momentary closure of this push button switch (Fig. 3) energizes the associated control relay 2CR and thereby causes a momentary opening of its contacts 2CR1 interposed in the energizing circuit of the maintaining contactor 1D (Fig. 5). As a precaution against inadvertent restarting in the event that the "run" relay 1CR should remain energized, normally closed contacts 2CR2 of the "stop" relay are placed in the circuit of the "run" relay 1CR so that deenergization of the latter is insured when the "stop" switch 35 is closed. It will thus be seen that in general the drive motor 16 may be either started or stopped by simply a momentary closure of the corresponding one of the "run" and "stop" push buttons 34 and 35.

As was previously noted, the speed of the drive motor 16 can be controlled through the medium of either of the alternatively available shunt field rheostats 45 or 55. In the preceding description, it was assumed that the speed range selector 25 was in its "Hi" position and hence the rheostat 55 is placed in control of the drive motor shunt field 40. In the event, however, that the tumbler switch 25 is shifted to its "Lo" position, the rheostat 45 is placed in control of the drive motor shunt field 40. In particular, if the switch 25 is shifted to its "Lo" position, the associated control relay 9CR is open-circuited (Fig. 3). As a result, the relay contacts 9CR2 (Fig. 5) open the shunt about the rheostat 45 so that it is rendered operative and at the same time the contacts 9CR4 close a shunt about the alternative rheostat 55. In addition, the contacts 9CR6 close to render the rheostat motor 47 operative to control the rheostat 45 while the contacts 9CR5 open-circuit the motor 56 of the rheostat 55. Thereafter the starting and stopping operations are carried out under the control of the "run" and "stop" switches 34 and 35 just as before. In either case, the direction of rotation is governed by the manual reversing switch S.

Finely graduated adjustments in the speed of the drive motor 16 may be attained through the use of either of the alternatively available rheostats 45 or 55. For purposes of the present description, it will be assumed first of all that the speed range selector 25 is in its "Hi" position and hence, that the rheostat 55 is operatively connected for control of the drive motor 16. In order to increase the motor speed under such conditions, all the operator need do is hold down the "faster" push button 26 until the motor speed increases to the value desired at which time the push button is released and the motor thereafter continues to run at the new higher speed. Such a closure of the push button "faster" switch 26 (Fig. 3) energizes the associated control relay 13CR which in turn connects the rheostat driving motor 57 across the supply lines L1—L2 with its field 58 in circuit by closure of the contacts 13CR1 (Fig. 5). When the motor 56 is energized in this manner, it changes the setting of the rheostat 55 in a direction to increase the drive motor speed. It should be noted at this point that since the rheostat motor 56 is also mechanically connected to the feed motor rheostat 54 that it will accomplish a simultaneous and commensurate change in feed motor speed. In order to decrease the speed of the drive motor 16, the "slower" push button switch 27 (Fig. 3) is closed, thereby energizing its associated relay 14CR and the closure of the relay contacts 14CR1 (Fig. 5) connects the rheostat motor 56 for rotation in the opposite direction with its field 59 energized. As soon as the hold-down "slower" switch 27 is released, the rheostat motor 56 is deenergized so that the drive motor 16 thereafter continues to operate at the new lower speed. Simultaneous energization of the speed control relays 13CR and 14CR is prevented by their interlock contacts 13CR2 and 14CR2 (Fig. 3). Thus energization of the relay 13CR opens its contacts 13CR2 in the energizing circuit of the other relay 14CR and in the same way energization of the relay 14CR opens its contacts 14CR2 in the circuit of the relay 13CR.

In the event that the selector switch 25 is in its "Lo" position so that the drive and feed motors 16 and 15 are operating under the control of their separate rheostats 45 and 44, it is necessary that some provision be made for causing the speed change switches 26 and 27 to control only a selected one of the motors rather than both of them simultaneously in the manner described above. In order to minimize the number of switches required on the portable control panel 22, the "run" switches 24 and 34 are used as selector switches for this purpose. Considering the case of the drive motor 16, if it is desired to change its speed while operating under the control of its independent rheostat 45 the drive "run" button 34 is held down and the "faster" or "slower" buttons 26 or 27 also held down until the desired change in speed is accomplished. In this speed changing operation energization of the control relay 1CR (Fig. 3) by holding down the "run" button 34 causes its contacts 1CR2 and 1CR3 (Fig. 5) to be closed as a preliminary to the energization of the rheostat motor 47. Then, if the "faster" push button 26 (Fig. 3) is closed to energize the relay 13CR, the contacts 13CR3 of the latter complete a circuit for the rheostat motor 47 and its field 52. Similarly, closure of the "slower" push button 27 energizes its associated relay 14CR (Fig. 3) so that the contacts 14CR3 (Fig. 5) are closed to energize the rheostat motor 47 and its field 53 for rotation in the opposite direction. It will be noted from the circuit of the rheostat motor 46 (Fig. 5), associated with the feed motor 15, that this rheostat motor 46 is not energized by the switching operations just described so that the drive motor 16 speed can be changed independently of that of the feed motor 15.

*Basic-speed feed motor operation*

The circuits are conditioned for operation of both the feed and drive motors 15 and 16 within what may be termed their "basic" speed ranges when the selector switch 25 is turned to its "Hi" position. As a matter of fact, with the circuit shown, the drive motor 16 also operates within this same basic speed range when the selector switch is in its "Lo" position although the feed motor 15, on the other hand, operates at a much lower speed. By the term "basic" speed range, reference is had to the speed range in which the motor operates with good speed regulation, despite changes in load, with full voltage applied to the armature. Good speed regulation in a machine tool driving motor is particularly important since changes in load are frequently imposed in such driving motors as, for example, when the cutting tool passes over a hard spot in the work piece or over open spaces in it, and it is necessary in attaining precision of operation that the motor speed should not change materially with such changes in load. Adjustable speed motors of the compound type are available on the market today which have a suitable speed regulation throughout a basic or normal speed range in which the upper limit of the speed range is substantially four times the lower limit. At speeds below this range, however, the regulation is poor. The ratio of the upper and lower limits of the "basic" range could be increased to as much as 8 to 1 by much more expensive motor construction, but even that increase in range is not sufficient for many machine tool applications. Accordingly, an arrangement has been provided as described below for effecting operation of the feed motor 15 in a very much lower range of speeds but without a sacrifice in regulation. This arrangement includes a variable resistance 62 (Fig. 4) which is also preferably utilized as a starting resistor for the feed motor 15 and as a dynamic braking resistor for this motor. The present portion of the description of the apparatus is concerned primarily, however, with the circuits used in operating the feed motor 15 in its "basic" or normal speed range and in which the table 10 is traversed at a fast-feed rate of, for example, from 75 to 300 inches per minute. The operation of the feed motor 15 in its slow-feed range is described in a subsequent section.

In order to condition the feed motor 15 for operation in its fast-feed range, the speed selector switch 25 is shifted to its "Hi" position (Fig. 3). As was previously described, this energizes the associated control relay 9CR thereby causing it to close its contacts 9CR1 and open its contacts 9CR3 (Fig. 4) so as to condition the shunt field rheostat 54 to control the speed of the feed motor 15 after the latter is started. At the same time, the contacts 9CR7 and 9CR8 (Fig. 4) are closed as a preliminary to the energization of the feed motor. As a second preliminary step in starting the feed motor 15, the direction control switch 28 is set in either its 'in' or 'out' position. Movement to the left as viewed in Fig. 1 may be conveniently referred to as "out" and movement in opposite direction as "in." Setting of the direction selector switch 28 in its respective "in" and "out" positions serves to energize the corresponding associated control relays 11CR or 12CR (Fig. 3). These relays in turn control the associated contacts 11CR1 and 12CR1 interposed in the energizing circuits of the respective main reversing contactors 1F and 2F (Fig. 4).

For purposes of explanation, it will be assumed that the speed selector switch 25 has been set in its "Hi" position and and the direction switch 28 in its "in" position. The operator may then initiate operation of the feed motor 15 by a momentary closure of the corresponding "run" push button 24 (Fig. 3). This closure of the "run" switch 24 momentarily energizes the associated control relay 3CR, thereby closing its contacts 3CR1 to complete an energizing circuit for the circuit maintaining relay 4CR. This relay 4CR closes its contacts 4CR1 in shunt with contacts 3CR1 so as to keep the relay 4CR energized after the momentary closure of the "run" relay 3CR. The simultaneous closure of contacts 4CR2 (Fig. 4) energizes the intermediate control relay 4F and the fast-feed contactor 9F, the circuit of the latter being completed through the previously closed speed range relay contacts 9CR8. Energization of this relay 4F causes its contacts 4F1 and 4F2 to close. As a result, the main reversing contactor 1F is energized (through the previous closed contacts 11CR1 and 9CR7 of the direction and speed range selector relays) so that the feed motor 15 is connected with the supply lines L₁—L₂ by the closure of the main reversing contacts 1F1 and 1F2. It will be noted that in this initial energization of the feed motor 15 that the armature 41 is connected across the supply lines in series with the lower end of the resistor 62 which acts as a starting resistance. In this same connection, it will be seen that the energization of the contactor 9F at starting causes its contacts 9F2 to open and disconnect the upper end of resistor 62 from the motor armature. After a predetermined time interval, the dash-pot controlled contacts 9F1 of the contactor 9F close to energize the contactor 3F so that its contacts 3F1 close to shut out the starting resistor from the armature circuit.

The feed motor shunt field 43 is connected directly across the supply lines L₁—L₂ during the starting operation so that the motor starts with full field. To this end, an auxiliary winding 7FA is provided on the accelerating relay 7F (Fig. 4). When the motor is started, this auxiliary winding 7FA is energized through the normally closed contacts 4F3 of the intermediate control relay 4F. Consequently, the contacts 7F1 of the accelerating relay are closed and shunt out the rheostats 44 and 54 from the motor shunt field circuit. After a predetermined time interval, the dash-pot controlled contacts 4F3 open to thereby deenergize the winding 7FA so that the contacts 7F1 also open. The opening of these latter contacts removes the shunt from about the speed control rheostat 54 so that the latter is cut into circuit relation with the motor shunt field 43. Thereafter, the feed motor 15 operates at a speed determined by the setting of the rheostat 54.

When it is desired to move the table 10 "out" rather than "in," the direction selector switch 28 is shifted to the corresponding "out" position, thereby energizing the associated direction control relay 12CR so that an energizing circuit for the corresponding reversing contactor 2F, rather than the other contactor 1F as described above, will be completed when the "run" button 24 is momentarily depressed. Closure of the contacts 2F1 and 2F2 (Fig. 4) of the main reversing contactor 2F causes the feed motor 15 to be energized in the opposite sense so as to effect rotation in a reverse direction. The sequence of of automatic switching operations during the starting are otherwise the same as that described for the "in" movement above.

The feed motor 15 may be stopped by the operator at any time by a momentary closure of the push button "stop" switch 29 (Fig. 3). Such a momentary closure of this "stop" switch energizes the associated control relay 5CR and it in turn opens its normally closed contacts 5CR1 and 5CR2 (Fig. 4) to deenergize the relay 4F, the contactor 9F, and the main reversing contactors 1F and 2F. As a safety precaution, normally closed contacts 5CR3 of the "stop" relay are placed in the energizing circuit of the "run" relay 3CR (Fig. 3) so that deenergization of the latter relay is positively insured when the "stop" switch 29 is closed. In addition, the normally closed contacts 5CR4 open-circuit the maintaining relay 4CR (Fig. 3). From the foregoing, it will be seen that the feed motor 15 may be readily stopped or started by merely a corresponding momentary actuation of the "run" and "stop" push buttons 24 and 29.

Finely graduated variations in speed of the feed motor 15 throughout its "basic" or fast-feed speed range are attained by means of the speed control rheostat 54. As was previously noted, this rheostat 54 is mechanically connected in tandem with the rheostat 55 being driven by the same rheostat motor 56 which also drives the rheostat 54. Accordingly, the rheostat motor 56 operates under the control of the "faster" and "slower" push buttons 26 and 27 to vary the setting of the feed motor rheostat 54 while simultaneously varying the setting of the drive motor rheostat 55 as was previously described.

When the speed of the feed motor 15 is being changed, unduly rapid acceleration is prevented by the acceleration control relay 7F, which has its main actuating winding connected in series with the feed motor armature 41 (Fig. 4). If the armature draws an excessive current, the relay 7F closes its contacts 7F1, thereby shunting out the rheostat 54 so that full voltage is applied to the shunt field 43 and the motor acceleration is momentarily checked until the armature current again drops to a safe value. When the armature current does again fall to a normal value, the contacts 7F1 reopen to restore the rheostat 54 to the circuit. It will be noted upon reference to Fig. 4 that the contacts 7F1 are arranged to control both of the rheostats 44 and 54 so that the acceleration relay is effective to govern the motor acceleration no matter which of the speed control rheostats is in use.

Unduly rapid deceleration of the feed motor 15 is prevented by the decelerating relay 8F. This relay is provided with both current and voltage actuating windings (Fig. 4) which serve to control a pair of normally closed contacts 8F1 connected in parallel relation with a resistor 63 in the motor shunt field circuit. During the normal operation of the feed motor 15, the magnetic field set up by the two actuating windings of the relay 8F oppose each other so that the contacts 8F1 remain closed to shunt the resistor 63 out of the field circuit. In the event of too rapid a deceleration, however, the direction of current flow through the motor armature 41 reverses so that the magnetic field set up by the two windings noted aid each other and hence open the contacts 8F1. As a result, the resistor 63 is connected in series relation with the motor shunt field 43, weakening its excitation and therefore checking the deceleration of the motor.

In the event of an overload on the feed motor 15, it is stopped by the overload relay 10F. This relay is connected in series with the motor armature 41 and series field 42 (Fig. 4) so that when excessive or overload current flows through the relay, it opens its contacts 10F1 thereby interrupting the energizing circuit of the relay 4F and contactor 9F. Opening of this latter relay and contactor causes the feed motor to be deenergized as was previously described in connection with the normal stopping operation. Upon reference to Figs. 4 and 5, it will be seen that current is supplied to the contactors 9F, 1F and 2F and relay 4F through a conductor 64, which is connected to the supply line L₁ through the drive motor overload relay contacts 5D1. Consequently, an overload on the drive motor 16 will also cause the feed motor 15 to be stopped. By virtue of this latter interlocking of circuits, the table 10 is stopped whenever too heavy a load is placed on the cutting tool 13.

Rapid traverse operation of feed motor

In some instances, it may be desirable to traverse the table 10 at a rate even higher than the fast-feed rate as, for example, to effect a rapid approach or rapid return movement of the work piece 14ª to or from the cutting tool 13. In order to obtain this high speed operation of the feed motor 15, full line voltage is applied across the armature and series field and the shunt field excitation is weakened. The circuits are arranged in such manner that the excitation of the feed motor 15 described can be attained by simply holding down the "traverse" push button switch 30 during the rapid traverse operation. Furthermore, in the arrangement illustrated, the "traverse" push button switch 30 is effective to cause energization of the feed motor for rapid traverse operation irrespective of whether the motor was previously operating in its fast-feed or slow-feed ranges or was stopped.

Closure of the "traverse" push button switch 30 energizes an associated rapid "traverse" relay 6CR (Fig. 3) which in turn opens its contacts 6CR1 and 6CR2 (Fig. 4). The opening of these contacts places the full resistance of either the rheostat 44 or 54 in series with the shunt field 43 with the result that the shunt field excitation is minimized. It will be understood that the resistance of one or the other of the rheostats 44 or 54, but not both, will be placed in series with the shunt field 43. The particular one of the rheostats which is operatively connected to the shunt field depends upon the setting of the speed range selector switch 25 by means of which the control relay 9CR is caused to shunt out one or the other of the field rheostats in the manner previously described. Furthermore, the energization of the "traverse" relay 6CR causes its contacts 6CR3 and 6CR4 (Fig. 4) to close in order to assure the application of full voltage to the motor armature 41. It will be noted that these contacts 6CR3 serve to complete an alternating energizing circuit for the relay 4F while the contacts 6CR3 and 6CR4 complete an alternating circuit for the contactor 9F. In the event that the feed motor 15 was previously operating in its fast-feed range and hence with the relay 4F and contactor 9F energized so that the resistor 62 was cut out of the armature circuit, then the closure of the contact 6CR3 and 6CR4 has no effect on the circuits since the full voltage was previously applied to the motor armature for the fast-feed operation. If the motor is operating in its slow-feed range, however, then the resistor 62 is connected in circuit to the motor armature 41 because of the open contacts 3F1. Consequently, the closure of the contacts 6CR3 and 6CR4 to energize the relay 4F and contactor 9F results in an opening of the contacts 9F2 and subsequent closing of the contacts 3F1 so that the resistor 62 is temporarily cut out of the armature circuit. Upon a subsequent opening of the "traverse" switch 30, the "traverse" relay 6CR opens and the feed motor returns to its previous speed or stopped condition.

It should be noted that the operation of the machine at a rapid traverse rate does not in any way affect the setting of the speed control rheostats 44 and 54 with the result that the machine automatically returns to its previous speed setting as soon as the "traverse" switch 30 is reopened. In the event that the "traverse" switch 30 is closed when the feed motor 15 is at rest, it serves to start the feed motor in operation for rapid traverse movement of the table even without closing the "run" switch 24. This result is accomplished since the "traverse" relay contacts 6CR3 are connected in parallel with the maintaining relay contacts 4CR2 (Fig. 4) so that the closure of either pair of contacts is effective to energize the relay 4F and start the feed motor 15 in operation.

Slow-feed range feed motor operation

In many machining operations, it is desirable to move one of the machine tool elements at a very low speed. For example, in the milling machine illustrated herein, it may be desirable to advance the table 10 at slow speeds of from, say, 3 to 10 inches per minute as compared to a fast-feed range of from 75 to 300 inches per minute. If the fast-feed range corresponds to the "basic" speed range of the driving motor, then operation below that range by simply inserting resistance in series with the armature will be accompanied by very poor speed regulation. In other words, if a heavy resistor is connected in series with the motor armature (to thereby decrease the voltage drop across the armature 41 and hence decrease the motor speed) changes in load will cause wide variations in motor speed. This is due to the fact that changes in load are accompanied by corresponding changes in armature current, but an increase in the armature current will also increase the voltage drop through the series resistance and therefore decrease the potential applied to the armature itself.

In order to attain the requisite speed regulation necessary for precise machining operations, together with the desired low speeds, a circuit has been provided for connecting a portion of the resistor 62 (Fig. 4) in shunt with the armature 41 and a second portion of the resistor in series therewith. Such a shunt resistance, acting in conjunction with the series resistance, has the effect of decreasing the potential applied to the armature without subjecting the armature to material fluctuations in voltage upon variations of armature current. Expressed mathematically, if $R_2$ is the shunt resistance, $R_A$ the armature resistance, and $R_X$ the sum of the parallel connected resistance $R_2$ and $R_A$, then:

$$\frac{1}{R_X} = \frac{1}{R_2} + \frac{1}{R_A} \qquad R_X = \frac{R_2 R_A}{R_2 + R_A}$$

or $$R_X = \frac{K R_A}{K + R_A}$$

where K is a constant. From an inspection of the last equation, it will be seen that $R_X$ remains substantially constant even with wide variations in $R_A$. In other words, the voltage drop across the armature will remain substantially constant even with wide fluctuations in the effective resistance of the armature which, of course, result from changes in load.

In the particular construction illustrated, if the operator wishes to advance the table 10 at a slow-feed rate, he shifts the selector switch 25 to its "Lo" position. This preparatory operation open-circuits the speed range selector relay 9CR with the result that: (a) the rheostat 44 is placed in control of the motor shunt field 43 by opening of the contacts 9CR1 while the alternatively available rheostat 54 is shunted out by closure of the contacts 9CR3 (Fig. 4); (b) contacts 9CR5 open to disable the rheostat motor 56 and contacts 9CR6 close to prepare a circuit for subsequent energization of the rheostat motor 46 (Fig. 5); (c) contacts 9CR8 are opened so that upon a subsequent closure of the "run" switch 24, the contactor 9F will remain deenergized but the relay 4F will be energized (Fig. 4). As a further preparatory operation, the operator shifts the direction selector switch 28 (Fig. 3) to either its "in" or "out" position depending upon the direction of movement desired, and this selector switch accordingly energizes either the relay 11CR or 12CR to condition the corresponding one of the main reversing contactors 1F—2F (Fig. 4) for subsequent energization.

After the preparatory switching operations described above, the operator may initiate operation of the feed motor 15 at its slow-feed rate by momentarily depressing the feed motor "run" button 24. Such momentary closure of the "run" switch 24 (Fig. 3) momentarily energizes the run relay 3CR which in turn causes the maintaining relay 4CR to be continuously energized as was described above with respect to the fast-feed operation. Closure of the maintaining relay contacts 4CR2 (Fig. 4) completes an energizing circuit for the intermediate control relay 4F, which in turn completes a circuit for one or the other of the reversing contactors 1F or 2F through its contacts 4F1 and 4F2. Energization of the selected reversing contactor connects the feed motor armature 41 and series field 42 across the supply lines $L_1$—$L_2$ for rotation of the feed motor in a selected direction. In this starting operation, the major or upper portion of the resistor 62 is connected in shunt with the motor armature 41 while the lower end portion of the resistor 62 is connected in series with the armature since the contacts 9F2 are closed and the contacts 3F1 open. In the slow-feed range operation now under consideration, the resistor 62 remains connected in the manner described throughout the operation since the contactor 9F is retained deenergized by the open contacts 9CR8. As a consequence, the feed motor 15 operates at a very low speed although with good speed regulation in view of the shunt and series connection of the resistor 62.

The feed motor shunt field 43 is, upon the initiation of the slow-feed rate movement, connected directly across the supply lines $L_1$—$L_2$ so as to apply a strong shunt field to the motor. This result is accomplished since the normally closed contacts 4F3 (Fig. 4) of the relay 4F retain the auxiliary winding 7FA of the relay 7F energized for a predetermined interval of time. Energization of this winding 7FA causes the contacts 7F1 to be closed and thereby shunt out the rheostats 44 and 54 from the shunt field circuit. After a predetermined interval of time, the dash-pot controlled contacts 4F3 open to deenergize the winding 7FA so that the contacts 7F1 in turn open. Thereafter, the feed motor continues to operate within its slow-feed range at a rate determined by the setting of the speed control rheostat 44.

Finely graduated variations in the speed of the feed motor 15 throughout its slow-feed range are attained by varying the shunt field excitation. Either the rheostat used in the fast-feed range operation or a different one could be used for this purpose. With the particular circuit arrangement illustrated, the separate rheostat 45 is utilized so that the speed of the feed motor 15 can be varied independently of the speed of the drive motor 16. It will be recalled that when the drive motor 16 was operated with its separate speed controlling rheostat 45 that the drive motor "run" button 34 was used as a selector switch when changing the speed of the drive motor. In the same way, the feed motor "run" button 24 is used as a selector switch when the feed motor is operating with its separate speed controlling rheostat 44. In general, a change in the setting of the feed motor rheostat 44 is accomplished by holding down the feed motor "run" button 24 and then pressing either the "faster" or "slower" button 26 or 27 until the speed has changed to the value desired. Holding down the "run" button 24 energizes the "run" relay 3CR to close its contacts 3CR2 and 3CR3 (Fig. 5) in the circuit of the rheostat motor 46 which is connected to the rheostat 44. Consequently, when the "slower" or "faster" buttons energize one or the other of their associated relays 13CR or 14CR to close their respective contacts 13CR3 and 14CR3, the rheostat motor 46 is connected across the supply lines $L_1$—$L_2$ with the corresponding one of its fields 49 or 50 in circuit. The setting of the rheostat 44 is thus varied in the sense desired and the release of either the "run" or speed change buttons deenergize the rheostat motor so that the feed motor 15 will continue to operate at its new speed.

The feed motor 15 can be stopped at will when operating in its slow-feed range by simply a momentary closure of its "stop" push button switch 29 (Fig. 3). As in the case of the fast-feed operation described above, such a momentary closure of the "stop" switch 29 energizes its associated relay 5CR. Such energization of the "stop" relay 5CR opens its contacts 5CR3 in the "run" relay circuit and its contacts 5CR4 in the maintaining relay circuit (Fig. 3) and, in addition, opens its contacts 5CR1 in the circuit of the intermediate relay 4F as well as its contacts 5CR2 in the circuit of the reversing contactors 1F—2F (Fig. 4). As a result, the feed motor 15 is open-circuited and stopped. In the same way, the overload relay 10F also remains operative during the slow-feed operation and in the event of an overload, opens its contacts 10F1 (Fig. 4) to interrupt the circuit of the intermediate relay 4F and reversing contactors 1F—2F. The interlock from the drive motor overload relay through the conductor 64 is, of course, equally effective for either speed range of the feed motor.

*Selected increment jogging*

The work supporting table or carriage 10 can, if desired, be automatically jogged through selected increments of distance. The low speeds obtained with the slow-feed drive previously described are particularly useful in accomplishing this type of operation. In general, the controls are so arranged that the feed motor 15 may be energized for slow-feed drive during a predetermined interval of time corresponding to the selected distance of movement for which the machine tool element is to be jogged. A time delay relay is utilized to deenergize the feed motor automatically at the termination of the selected time interval. In the particular arrangement illustrated, the time delay relay TD (Figs. 3 and 4) accomplishes this timing function. This relay is provided with a main winding TDM and an opposed or neutralizing winding TDN. When the main winding TDM is open-circuited, its slowly decaying magnetic field is, after a corresponding time interval, overcome by the opposing field of the neutralizing winding TDN so that the time interval between the open-circuiting of the main winding and the final opening of the associated contacts depends upon the magnitude of the magnetic field set up by the neutralizing winding. The magnitude of this neutralizing field is controlled by the setting of an adjustable rheostat 33 (Fig. 3) which in this instance is mounted upon the portable control station 22 (Fig. 2). It is, of course, clear that the larger the resistance placed in series with the neutralizing winding TDN by the rheostat 33, the smaller will be the current through the neutralizing winding and hence the longer the time interval for operation of the relay. The rheostat 33 is provided with a graduated scale 33ᵃ (Fig. 2) calibrated in increments of distance such as thousandths of an inch. In other words, the scale 33ᵃ is so calibrated that the operator can read directly in fractions of an inch the distance which the carriage 10 will move during the time delay interval for the opening of the relay TD corresponding to the setting of rheostat 33.

In conditioning the machine tool for automatic jogging, the operator first sets the selector switches 25, 28, and 32 (Fig. 2) and also sets the rheostat 33 to the position indicated on the scale 33ᵃ for the distance through which he wishes to jog the table. The switch 25 is set in its "Lo" position thereby deenergizing the relay 9CR to condition the feed motor 15 for low speed operation as previously described. This relay is provided with a pair of normally closed contacts 9CR9 (Fig. 3) in the jog relay circuit so that automatic jogging can only be accomplished when the feed motor is conditioned for low speed operation. The selector switch 28 is set for either "in" or "out" movement as may be required, thereby energizing either the corresponding relay 11CR or 12CR so that when the machine is later started, the corresponding one of the main reversing contactors 1F or 2F will be closed to effect rotation of the feed motor 15 in the desired direction. By moving the selector switch 32 to its "auto" or automatic position, a control relay 10CR (Fig. 3) is energized which in turn opens its normally closed contacts 10CR1 and closes its contacts 10CR2 as a preparatory switching operation in the jog relay circuits (Fig. 3) and at the same time, closes its contacts 10CR3 to energize the time delay relay main winding TDM (Fig. 4). It will be noted that the time delay relay neutralizing winding TDN is normally energized through the rheostat 33.

Having thus set up the circuits by manipulation of the various selector switches, the operator initiates the automatic jog movement by momentarily closing the jog push button switch 31 (Fig. 3). Closure of this latter switch energizes both the jog relays 7CR and 8CR. It will be noted that the control relay 7CR is energized through a circuit including the jog switch 31, contacts 9CR9 of the speed range selection relay 9CR and contacts TD1 of the time delay relay. Having once been energized, however, the relay 7CR closes its contacts 7CR1 in shunt with the jog switch 31 so that the relay 7CR remains energized after the jog button is released. Inadvertent closing of the maintaining relay circuit (4CR) is prevented by the opening of the normally closed contacts 7CR5 (Fig. 3).

The effect of energizing the control relay 7CR as described above is to set the feed motor 15 in operation at its slow-feed rate. In particular, the closure of contacts 7CR2 (Fig. 4) energizes one or the other of the main reversing contactors 1F or 2F depending upon which one of the control relays 11CR or 12CR is energized, and a voltage is applied to the feed motor armature for rotation in a corresponding direction. It will be noted that the contactor 9F remains deenergized so that the contact 9F2 is closed and contact 3F1 is open. As a result, the major portion of the resistor 62 is connected in shunt with the feed motor armature 41 while the lower portion of this rheostat is connected in series with such armature so that the low speed operation is attained as heretofore described. Full line voltage is applied to the motor shunt field 43 since the auxiliary winding 7FA on the accelerating relay is energized by the closure of the contacts 7CR3 so that the contacts 7F1 are closed to shunt out the rheostats 44 and 54.

The timing cycle for the time delay relay TD is initiated by the momentary closure of the jog push button 31. In particular, the energization of the control relay 8CR, resulting from the closure of the jog switch 31 as previously noted, opens its contacts 8CR1 (Fig. 4) so as to deenergize the main winding TDM of the time delay relay. Accordingly, the magnetic field set up by this main winding begins to decay as soon as the push button switch 31 is closed and the time delay relay TD is finally opened by the demagnetizing effect of the neutralizing winding TDN after the predetermined time interval determined by the setting of the rheostat 33. Such opening of the time delay relay causes its contacts TD1 to open, thereby interrupting the energizing circuit of the control relay 7CR (Fig. 3). Deenergization of this relay in turn causes its contacts 7CR2 to open to stop the feed motor 15 (Fig. 4).

It will be appreciated that during the jogging operation, the feed motor 15 is rotated at minimum speed. This is accomplished since the speed range selecting mechanism is set in its "Lo" position so that portions of the resistor 62 are connected in shunt and in series with the feed motor armature 41. Also, as was previously noted, full line voltage is applied to the shunt field 43. It is, of course, particularly necessary that the speed controlling rheostats 44 and 54 should play no part in determining the motor speed during this automatic jogging operation since the accuracy of measurement of the distance traveled presupposes a fixed motor speed in view of the fact that the measurement is accomplished by a timing operation. The contacts 7F1 of the accelerating relay 7F effectively shunt out the speed controlling rheostats during this automatic jogging operation. The operation of the automatic jog will not be affected by continued depression of the jog button 31. In such a case, the relay 8CR will be energized as long as the button 31 is depressed and its contacts 8CR1 will remain open. The contacts TD1 will be opened in the usual manner to deenergize the relay 7CR and thus stop the motor 15 after the preselected time interval has elapsed. The continued energization of the relay 8CR thereby prevents reenergization of the coil TDM until the button 31 is released and energization of the relay 7CR and the initiation of another jog cycle cannot take place until the button 31 is again depressed.

From the foregoing, it will be seen that an arrangement has been provided by means of which a machine tool element, such as the table 10, can be conveniently and expeditiously jogged through various predetermined increments of distance. The scale 33ᵃ on the rheostat 33 makes it possible for the operator to condition the machine with great facility for the desired jogging and without the necessity of making any mathematical computations to translate time and speed into terms of distance.

Manually controlled jogging

Manually controlled jogging of the machine with stoppage at will, as distinguished from automatic stoppage after a selected distance of movement heretofore described, can also be accomplished with the machine illustrated. The preliminary switching operations are similar to those for automatic jogging. In the present instance, however, the selector switch 32 is moved to its "hand" or open-circuit position and of course the rheostat 33 plays no part in the operation. The direction selector switch 28 is set for the desired direction of movement thereby conditioning the reversing contactors 1F or 2F for subsequent actuations through the medium of the corresponding relays 11CR and 12CR. Moreover, the speed range selector switch 25 may be set in either its "Hi" or "Lo" positions since the manual jogging may be done with the feed motor 15 operating in either its fast-feed or slow-feed ranges.

Assuming that the operator has moved the selector 25 to its "Lo" position for slow-feed manual jogging, he then uses the jog button 31 as a hold-down switch to cause the feed motor 15 to be energized for slow-feed movement only during such time as the jog button is held depressed. Such closure of the jog button switch 31 (Fig. 3) energizes the control relay 7CR through the normally closed contacts 10CR1 of the open-circuited relay 10CR. Incidentally, the control relay 8CR is also energized but it has no effect on the manual jogging operation since the time delay relay contacts TD1 are shunted by the contacts 10CR1. Energization of the control relay 7CR closes its contacts 7CR2 (Fig. 4) so that one or the other of the main reversing contactors 1F or 2F is energized to initiate rotation of the feed motor 15 in a corresponding direction. The contactor 9F remains deenergized so that the feed motor armature 41 is shunted by a portion of the resistor 62 and is connected in series with the lower portion of this resistor thereby causing the feed motor to operate at low speed as previously described with respect to the slow-feed range operation. Also the motor operates with full shunt field excitation since the contacts 7CR3 complete an energizing circuit for the auxiliary winding 7FA of the relay 7F to close its contacts 7F1 in shunt with the speed adjusting rheostats 44 and 54 (Fig. 4). The feed motor 15 continues to operate at this same slow speed until the jog button 31 is released to thereby deenergize the control relay 7CR and stop the motor. It will be noted that the contacts 7CR1 (Fig. 3) do not complete a maintaining circuit about the jog switch 31 since the contacts 10CR2 are open when the machine is conditioned for manual jogging.

In the event that the operator wishes to jog the machine at a relatively faster rate, the speed range selector switch is set in its "Hi" position and the same general sequence of operation, as described above, is then carried out. With the selector switch 25 set in its "Hi" position, the associated control relay 9CR is energized so that its contacts 9CR7 and 9CR8 (Fig. 4) are closed in preparation for energization of the contactor 9F and relay 4F. Accordingly, when the jog button switch 31 is closed to thereby energize the jog relay 7CR (Fig. 3), contacts 7CR4 and 7CR2 of the latter (Fig. 4) are closed and an energizing circuit is completed for the contactor 9F and relay 4F through the contacts 9CR8, 7CR4, 9CR7, and 7CR2. The result of energizing this contactor 9F and relay 4F is to open the contacts 9F2 and subsequently energize the contactor 3F so that its contacts 3F1 will be closed, all with the ultimate result that the resistor 62 is entirely cut out of the circuit of the feed motor armature 41 so that the feed motor operates in its fast-feed range rather than in its low-feed range. Full shunt field excitation is retained, however, since the contacts 7CR3 (Fig. 4) retain the auxiliary winding 7FA on the relay 7F energized and its contacts 7F1 closed. This high speed jogging movement of the machine is stopped by simply releasing the jog button 31 so as to deenergize the associated jog relay 7CR.

Dynamic braking

Precision machining operations require instant stopping of the work table 10 as soon as its feed motor 15 is deenergized. Overrunning of the selected stop position as the feed motor coasts freely to a standstill would, of course, be particularly objectionable when using the automatic jogging control described above, for there the accuracy of the measurement of the distance jogged depends upon the length of the time interval during which the motor is energized, and hence the interval in which it is rotating at a fixed speed must coincide as exactly as possible with the interval during which it is energized. The use of an automatic dynamic braking system in which a single resistor is connected across the feed motor armature as the feed motor coasts to a stop is precluded, however, by the wide variations in speed at which the motor may be operating when it is braked. For example, if the motor is operating in its high speed or fast-feed range and is dynamically braked, a comparatively high resistance must be used or the current flowing through the resistor will be so heavy as to burn it out. If such a large resistor is used to accomplish dynamic braking of the motor when it is operating at its low or slow-feed speed, the braking will be too small to accomplish a sufficiently rapid stop.

In order to provide effectually rapid braking of the motor to a standstill from any speed, a plural step dynamic braking system has been utilized. In the particular arrangement, when the feed motor controlling contactors 1F, 2F and 4F are deenergized to stop the feed motor 15, the motor circuit is disconnected from its supply line L₁—L₂ but the contacts 9F2 close (because of the deenergization of contactor 9F) so that a circuit is completed for current to circulate through the motor armature 41 and the resistor 62. This constitutes the first step in the dynamic braking operation. Due to time delay action of the contacts 9F1, the contacts 3F1 of the contactor 3F remain closed for a short interval of time and during this interval, all of the resistance 62 is connected across the motor armature 41. Upon opening of these contacts 3F1, the portion of the resistor 62 connected across the armature 41 is somewhat decreased (see Fig. 4) for the second step of the dynamic braking operation.

When the potential developed across the armature 41 by the circulating current finally falls to a predetermined low value, the dynamic braking relay 6F is deenergized thereby permitting its contacts 6F1 to close and energize the relay 5F so that its contacts 5F1 close and cut out a still further portion of the resistor 62 for the third and final step of the braking operation. It will be noted that during normal operation, the potential on the supply lines L₁—L₂ retains the relay 6F energized so that the associated relay contacts 5F1 are retained open.

From the foregoing, it will be seen that by the use of successive steps of dynamic braking described, the feed motor 15 can be quickly braked to a standstill from any speed at which it may have been previously operating. Moreover, this braking operation is accomplished without danger of overloading the dynamic braking resistor.

I claim as my invention:

1. A machine tool comprising, in combination, relatively movable work and tool supports, a rotatable cutter carried by said tool support, individual power actuating mechanisms for respectively effecting relative movement between said supports and rotating said cutter, means operable at will to adjust the speed of one of said power actuating mechanisms, and means operable automatically during such speed adjustment to adjust the speed of said other mechanism and maintain a preselected ratio of speeds between said power actuating mechanisms irrespective of changes effected in the speed of said one mechanism by said last named means.

2. In a machine tool comprising, in combination, a plurality of relatively movable machine tool elements, individual power actuating mechanisms for said elements, means for varying the speed of at least one of said power actuating mechanisms, and means for automatically maintaining a predetermined relation between the individual speeds of said power actuating means irrespective of the changes in the speed of any one of said mechanisms effected by said last named means.

3. A machine tool comprising, in combination, relatively movable work and tool supports, a rotatable cutter carried by said tool support in operative relation with a work piece on said work support, individual electric driving motors for respectively effecting relative movement between said supports and rotating said cutter, each of said motors including cooperating armature and field members having energizable windings thereon, energizing circuits for each of said field windings, and means for simultaneously varying the operative speeds of said motors including tandem connected variable-setting rheostats interposed in the respective field winding circuits for automatically maintaining a preselected ratio of speeds between said motors.

4. In combination, a plurality of relatively movable members, a first power actuating mechanism for effecting relative movement between certain of said members, a second power actuating mechanism for independently moving one of said members, individual variable-setting speed-change devices associated with each of said mechanisms, means including two hold-down switches for initiating operation of one or the other of said power actuating mechanisms in response to a momentary actuation of the corresponding one of said switches, a common speed-change control mechanism governing the operation of said devices, and means responsive to a maintained actuation of one or the other of said switches for rendering said speed-change control mechanism operative to change the setting of the speed-change device for the corresponding power actuating mechanism.

5. In combination, at least two movable elements, individual variable speed power actuating mechanisms for each of said two elements, individual variable-setting speed-change devices associated with each of said power actuating mechanisms, a second variable-setting speed-change device associated with both of said power actuating mechanisms for effecting simultaneous variations in the speeds thereof while maintaining a predetermined ratio of such speeds, selector means for rendering either said individual speed-change devices or said second speed-change device operative to control their associated power actuating mechanisms, a speed-change control mechanism, means including two hold-down switches for initiating operation of one or the other of said power actuating mechanisms in response to a momentary actuation of the corresponding one of said switches, means responsive to the setting of said selector means for conditioning said speed-change control mechanism to govern the corresponding one of said speed-change devices, and means responsive to a maintained actuation of one or the other of said switches for rendering said speed-change control mechanism operative to change the setting of corresponding ones of said individual variable-setting speed-change devices when the latter are rendered operative by said selector means.

6. In a machine tool, the combination of a plurality of relatively movable machine tool elements, individual power actuating mechanisms for each of said plurality of elements, each of said mechanisms including an electric motor and speed-control circuit therefor, means including a first set of individual rheostats in said circuits for separately varying the speeds of the associated electric motors, means including a second set of mechanically interconnected rheostats in said circuits for simultaneously varying the speeds of all of said motors while maintaining a predetermined speed ratio therebetween, and selector means for alternatively rendering one of said sets of rheostats operative and the other inoperative.

7. In a machine tool, the combination of relatively movable work and tool supports, a power actuating feed mechanism for effecting a relative feed movement between said supports, a rotatable cutter on said tool support, a power actuating drive mechanism for rotating said cutter, speed selector means for conditioning said feed mechanism for operation alternatively either in a slow-feed range or in a fast-feed range, first speed control means for simultaneously varying the speeds of both of said feed and drive mechanisms while maintaining a predetermined ratio between their speeds, second speed control means for effecting separate and unrelated variations in the speeds of said feed and drive mechanisms, and means responsive to the alternative settings of said selector means for alternatively rendering one of said speed-control means operative and the other inoperative.

8. A machine tool comprising, in combination, a plurality of movable machine tool elements, individual variable speed power actuating mechanisms for each of said machine tool elements, control means for simultaneously varying the speeds of said power actuating mechanisms in predetermined ratio, a second control means operable alternatively to said first named control means for effecting speed changes in individual selected ones of said power actuating mechanisms, and selector means for rendering one or the other of said control means operative and the other inoperative.

9. In a machine tool, the combination of relatively movable work and tool supports, a power actuating feed mechanism for effecting a relative feed movement between said supports, speed selector means for conditioning said feed mechanism for variable speed operation alternatively either in a slow-feed range or in a fast-feed range, and manually operable means for selectively varying the speed of said feed mechanism throughout either of the ranges determined by the selective setting of said speed selector means.

10. In combination, a movable element which is subjected to changes in load or resistance to movement, means including a variable speed electric motor having close speed regulation upon changes in load at high speeds and relatively poor regulation at low speeds for driving said element at selected fast-feed rates, said motor including cooperating field and armature members having energizable windings thereon, and means for conditioning said motor to drive said element at slow-feed rates without substantial sacrifice in speed regulation upon changes in load at the low speeds, said last named means including means operable to connect two resistors respectively in series and in shunt relation with said armature winding.

11. The combination with a plurality of relatively movable elements between which relative movement is effected by an electric motor having energizable field and armature windings, of an electric supply circuit for said windings, means operable at will to alternatively energize said armature winding for high or low speed operation by applying respectively either the full potential of said circuit to said armature winding or a fraction of said potential through the medium of two resistors connected respectively in series and shunt relation with said armature winding, and means including a rheostat operative to vary the excitation of said field winding for varying the speed of relative movement of said elements through either a low or high range of speeds depending upon the setting of said first named means.

12. The combination with a plurality of relatively movable elements between which relative movement is effected by an electric motor having energizable field and armature windings, of an electric supply circuit for said windings, means operable at will to alternatively energize said armature winding for high or low speed operation by applying respectively either the full potential of said circuit to said armature winding or a fraction of said potential, and means maintaining the fractional voltage applied to said armature substantially constant despite changes in load for preventing changes in speed with load.

13. A machine tool comprising, in combination, a movable machine tool element, a power actuating mechanism for said element including an electric control circuit, a first jog switch in said circuit, means responsive to a momentary actuation of said first jog switch for rendering said mechanism operative to move said element through a selected increment of distance, a second jog switch of the hold-down type in said circuit, means responsive only to the maintenance of said second jog switch in a predetermined position for rendering said mechanism operative to move said element during the interval that said second jog switch is maintained in said position, and a selector for rendering one or the other of said jog switches inoperative to govern the operation of said mechanism.

14. A machine tool comprising, in combination, a movable machine tool element, a power actuating mechanism for said element including an electric control circuit, means including a selector switch in said circuit for conditioning said power actuating mechanism to drive said element at a speed within either a fast-feed range or a slow-feed range depending upon the setting of said selector, a jog switch in said circuit, and means responsive to a momentary actuation of said jog switch for rendering said mechanism operative to jog said element through a predetermined increment of distance at a fixed speed within said slow-feed range irrespective of the setting of said slector.

15. A machine tool comprising, in combination, a movable machine tool element, a power actuating mechanism for said element including an electric control circuit, means including a first selector switch in said circuit for conditioning said power actuating mechanism to drive said element at a speed within either a fast-feed range or a slow-feed range depending upon the setting of said selector, a first jog switch in said circuit, means responsive to a momentary actuation of said first jog switch for rendering said mechanism operative to jog said element through a predetermined increment of distance at a fixed speed within said slow-feed range irrespective of the setting of said first selector, a second jog switch in said circuit of the hold-down type, means responsive only to the maintenance of said second jog switch in a predetermined position for rendering said mechanism operative to move said element during the interval said second jog switch is maintained in said position at a speed in either said fast-feed range or said slow-feed range depending upon the setting of said first selector, and a second selector for rendering one or the other of said jog switches operative to govern said mechanism and the other inoperative.

16. A machine tool comprising, in combination, a movable machine tool element, a power actuating mechanism for said element including an electric control circuit, means including a selector switch in said circuit for conditioning said power actuating mechanism to drive said element at a speed within either a fast-feed range or a slow-feed range depending upon the setting of said selector, a jog switch in said circuit, and means controlled by said jog switch for conditioning said mechanism to drive said element at either a fast-feed rate or a slow-feed rate depending upon the setting of said selector.

17. A machine tool comprising, in combination, a movable machine tool element, a plural speed-range drive mechanism for said element, selector means for conditioning said mechanism to move said element at a speed within a selected range, and jog control means for conditioning said mechanism to move said element at a predetermined fixed speed irrespective of the setting of said selector means.

18. In a machine tool, the combination of a movable machine tool element, variable speed power actuated means for moving said element, speed control means for selectively varying the speed of said power actuated means, and jog control means for conditioning said power actuated means to jog said element for a predetermined interval of time and at a fixed speed irrespective of the previous setting of said speed control.

19. The combination with a movable machine element of, power actuating mechanism therefor, a time delay relay having a normally energized neutralizing winding and a normally energized main winding exerting a magnetic effect in opposition to and normally overcoming the effect of said demagnetizing winding, manually operable jog control means coacting with said relay when both of said windings are energized and operable when actuated to initiate operation of said mechanism to move said element at a predetermined fixed speed, and means responsive to actuation of said jog control means to deenergize said main winding whereby to cause said relay to stop said mechanism when the decreasing magnetic field of said main winding is overcome by that of said neutralizing winding.

20. The combination with a movable machine element of, power actuating mechanism therefor, a time delay relay having a normally energized neutralizing winding and a normally energized main winding exerting a magnetic effect in opposition to and normally overcoming the effect of said demagnetizing winding, manually operable jog control means coacting with said relay when both of said windings are energized and operable when actuated to initiate operation of said mechanism to move said element at a predetermined fixed speed, means responsive to actuation of said jog control means to deenergize said main winding whereby to cause said relay to stop said mechanism when the decreasing magnetic field of said main winding is overcome by that of said neutralizing winding, and selectively operable manual means for adjusting the degree of energization of one of said windings whereby to vary the extent of the jogging interval.

21. The combination of a plurality of movable members, a plurality of power driven mechanisms respectively operable to produce different relative movements between said elements, individual speed adjusting devices each associated with one of said mechanisms and operable to increase or decrease the effective operating speed thereof progressively, manually operable push button switches respectively associated with said mechanisms and each adapted when depressed momentarily to initiate operation of the corresponding mechanism, and manually operable control means arranged to be associated with one or the other of said adjusting devices selectively by holding down the corresponding one of said push buttons and operable alternatively to increase or decrease the speed setting of the associated adjusting device.

22. In combination, a movable element which is subjected to changes in load or resistance to movement, means including a variable speed electric motor for driving said element at selected fast-feed rates, said motor having close speed regulation upon changes in load at high speed and relatively poor regulation at low speeds, said motor including cooperating field and armature members having energizable windings thereon, means for conditioning said motor to drive said element at slow-feed rates without substantial sacrifice in regulation upon changes in load at the low speeds, said last named means including means operable to connect two resistors respectively in series and in shunt relation with said armature winding, and means operable to disconnect said armature winding from its source of current and to connect at least one of said resistors in shunt with the armature winding to utilize the same resistor or resistors for dynamically braking the motor.

23. In combination, a movable element which is subjected to changes in load or resistance to movement, means including a variable speed electric motor for driving said element at selected fast-feed rates, said motor having close speed regulation upon changes in load at high speed and relatively poor regulation at low speeds, said motor including cooperating field and armature members having energizable windings thereon, means for conditioning said motor to drive said element at slow-feed rates without substantial sacrifice in speed regulation upon changes in load at the low speeds, said last named means including means operable to connect first and second resistors respectively in series and in shunt relation with said armature winding, and means operable to disconnect said armature winding from its source of current and to connect both of said resistors in shunt relation with the armature winding to utilize both of said resistors in an initial step for dynamically braking the motor and for subsequently connecting only said second resistor in shunt relation with said armature winding for a second step of dynamic braking.

WILLIAM F. RIDGWAY.